(12) United States Patent  
Nakamura et al.

(10) Patent No.: US 7,304,754 B1  
(45) Date of Patent: Dec. 4, 2007

(54) IMAGE INPUTTING AND OUTPUTTING APPARATUS WHICH JUDGES QUALITY OF AN IMAGE

(75) Inventors: Koji Nakamura, Tokyo (JP); Atsushi Ito, Asaki (JP); Hitoshi Ueno, Asaka (JP); Toshiyuki Takao, Tokyo (JP); Shigeharu Hara, Tokyo (JP)

(73) Assignee: FujiFilm Corporation, Tokyo (JP)

( * ) Notice: Subject to any disclaimer, the term of this patent is extended or adjusted under 35 U.S.C. 154(b) by 1594 days.

(21) Appl. No.: 09/624,916

(22) Filed: Jul. 24, 2000

(30) Foreign Application Priority Data

Jul. 22, 1999 (JP) ................................. 11-207320

(51) Int. Cl.  
*G06F 3/12* (2006.01)  
*G06K 1/00* (2006.01)

(52) U.S. Cl. ...................................... 358/1.15; 358/1.9  
(58) Field of Classification Search ............... 358/1.15, 358/1.13, 1.14, 1.16, 1.9, 501, 527, 401, 358/404  
See application file for complete search history.

(56) References Cited

U.S. PATENT DOCUMENTS 6,072,936 A * 6/2000 Koyama ....................... 386/95  
6,154,755 A * 11/2000 Dellert et al. ................ 715/526

FOREIGN PATENT DOCUMENTS

JP 11-146313 5/1999

* cited by examiner

*Primary Examiner*—Douglas Q. Tran  
(74) *Attorney, Agent, or Firm*—McGinn IP Law Group, PLLC

(57) ABSTRACT

The number of pixels of image data recorded in a recording medium is determined, and it is determined whether or not an image to be looked at will be of good quality according to the determined number of the pixels and the number of pixels required for an apparatus that will print or display the image. An image list on a print image selecting picture has frames of colors according to the determination result. The user can easily select image files with resolutions suitable for the print size even if the user does not have a special knowledge of a quality, pixels and a resolution of photo image data.

26 Claims, 9 Drawing Sheets

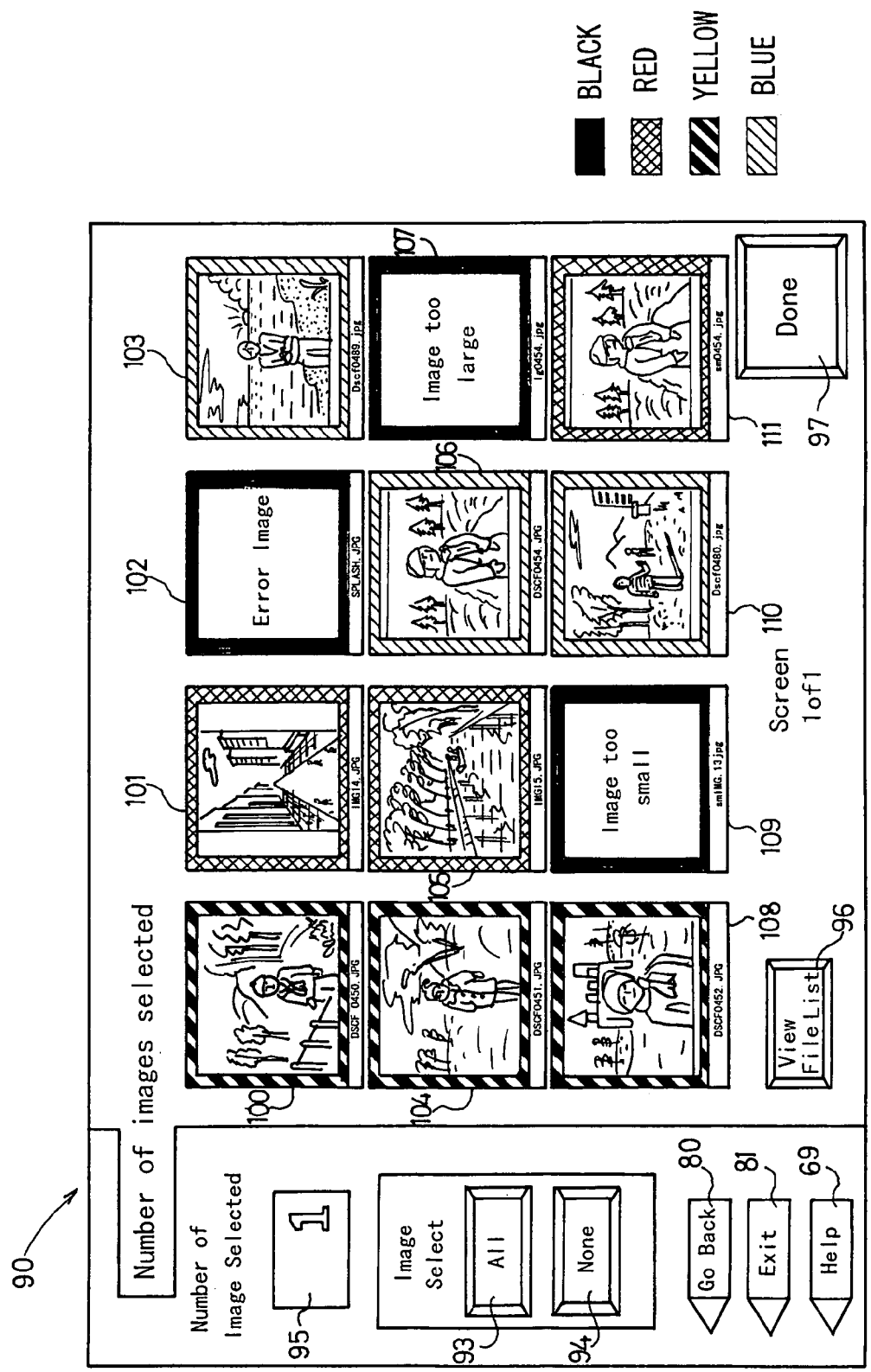

F I G. 6

| PRINT SIZE / NUMBER OF PIXELS | 3.5×5(inch) 89×127(mm) | 4×6(inch) 102×152(mm) | 5×7(inch) 127×178(mm) | 8×10(inch) 203×257(mm) |
|---|---|---|---|---|
| 4096×4096 OR LARGER | TOO LARGE (BLACK FRAME) | TOO LARGE (BLACK FRAME) | TOO LARGE (BLACK FRAME) | TOO LARGE (BLACK FRAME) |
| 2560×1920 OR LARGER | EXELENT (BLUE FRAME) | EXELENT (BLUE FRAME) | EXELENT (BLUE FRAME) | EXELENT (BLUE FRAME) |
| 1280×960 OR LARGER | EXELENT (BLUE FRAME) | EXELENT (BLUE FRAME) | EXELENT (BLUE FRAME) | GOOD (YELLOW FRAME) |
| 640×480 OR LARGER | GOOD (YELLOW FRAME) | GOOD (YELLOW FRAME) | GOOD (YELLOW FRAME) | FAIR (RED FRAME) |
| 160×120 OR LARGER | FAIR (RED FRAME) | FAIR (RED FRAME) | FAIR (RED FRAME) | TOO SMALL (BLACK FRAME) |
| SMALLER THAN 160×120 | TOO SMALL (BLACK FRAME) | TOO SMALL (BLACK FRAME) | TOO SMALL (BLACK FRAME) | TOO SMALL (BLACK FRAME) |
| IMAGE DATA ABNORMAL | ERROR (BLACK FRAME) | ERROR (BLACK FRAME) | ERROR (BLACK FRAME) | ERROR (BLACK FRAME) |

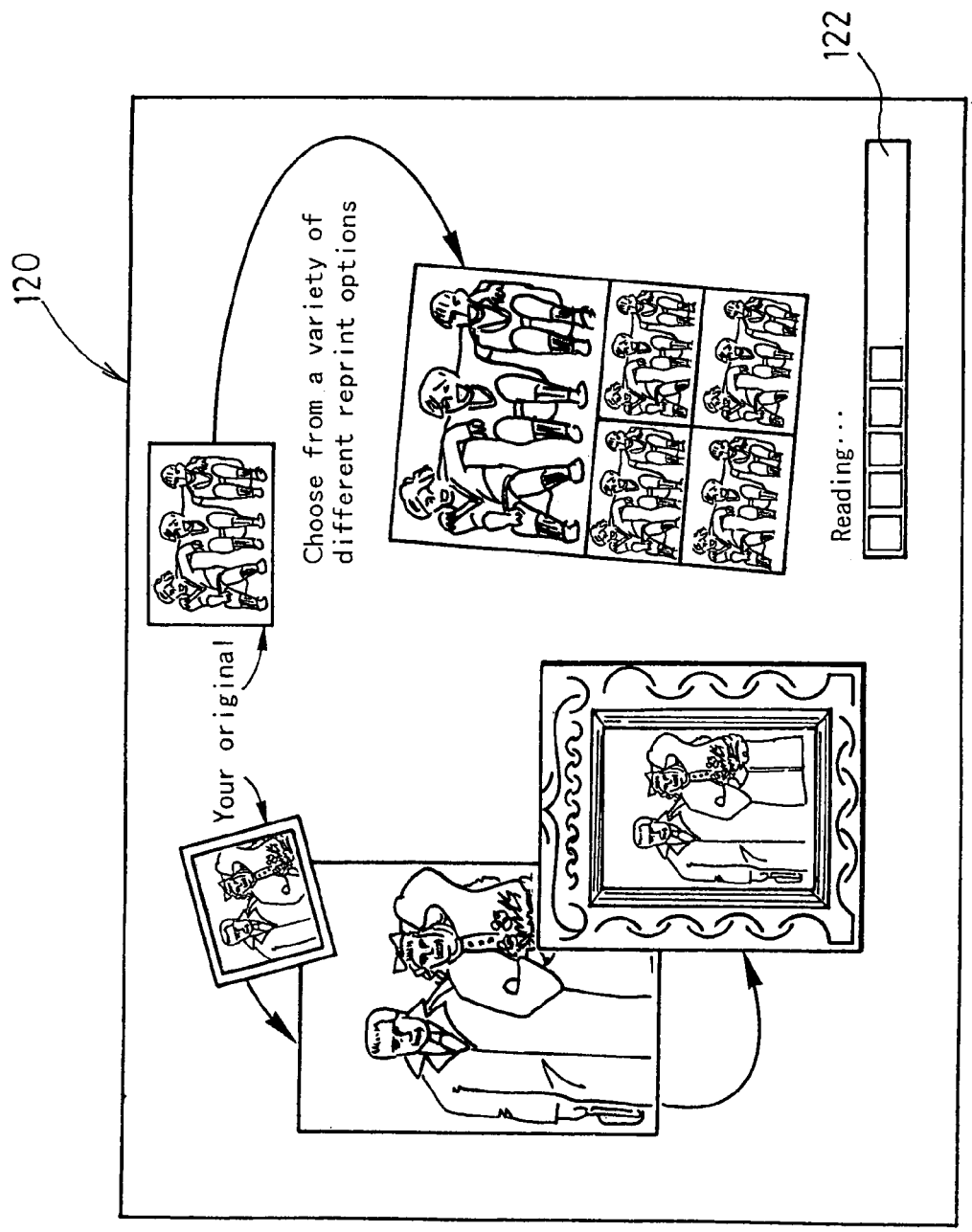

IMAGE INPUTTING AND OUTPUTTING APPARATUS WHICH JUDGES QUALITY OF AN IMAGE

BACKGROUND OF THE INVENTION

1. Field of the Invention

This invention relates to an image inputting and outputting apparatus, more particularly to an image inputting and outputting apparatus that indicates estimated resolutions of printed images by colors according to resolutions of image data when the images are selected for printing with a print image outputting device which the users can operate by themselves and which can be provided at any specified location, for example, store, amusement facilities, etc.

2. Description of Related Art

A print image outputting device that has an image inputting part such as a memory card inputting part for inputting image data and displays images recorded in a recording medium as a list is already known. The user selects for selecting images for printing out of the images, and the selected images are printed.

Japanese patent provisional publication No. 11-146313 discloses an information processing device that prints images and changes the color of the selected images to inform the user that the image files have been selected.

In a browser for visiting web sites of the Internet, techniques are known in which the sizes of images or the sizes of image file are written beside image list to roughly indicate a downloading time and in which a blue frame is displayed around an image before the image file is downloaded and a purple frame is displayed around the image after the image file is downloaded to inform the user that the image file has been downloaded.

When image data captured with a digital camera is printed, the image is enlarged or reduced according to the print size. However, general users do not know how many pixels are needed for the print size. For example, if an image data whose resolution is VGA (640×480 pixels) is printed on an A4 paper at 300 dpi, the resolution of 2504×3532 pixels is required and the resolution is too low for the printed image to be suitable for being looked at.

Even if the image data is printed on a postcard-sized-paper (1242×1832 pixels), the printed image is not of good quality. When the image data does not have enough pixels for the print size, the printed image is of poor quality even if an interpolating processing is performed at the printing. The number of the pixels of the images on the image list is too small for the user to determine the quality of the printed image.

SUMMARY OF THE INVENTION

It is therefore an object of the present invention to provide an image inputting and outputting apparatus with which the user can easily select image files with resolutions suitable for the print size even if the user does not have a special knowledge of a quality, pixels and a resolution of photo image data.

To achieve the above object, the present invention is directed to an image inputting and outputting apparatus, comprising: an image inputting device which reads image data of at least one image recorded in a recording medium; a determining device which determines a number of pixels of the image data read by the image inputting device; a judging device which judges quality of an image that will be obtained when the image data read by the image inputting device is outputted to an outputting apparatus that performs at least one of printing and displaying of the at least one image, according to the number of the pixels determined by the determining device and a number of pixels required by the outputting apparatus; a displaying device which displays the at least one image according to the image data read by the image inputting device and displays a judging result obtained by the judging device; an instructing device which issues an instruction to an image outputting device to output the image data to the outputting apparatus; and the image outputting device which outputs the image data to the outputting apparatus according to the instruction issued by the instructing device.

To achieve the above object, the present invention is directed to an image inputting and outputting apparatus, comprising: an image inputting device which reads image data of at least one image and information on the image data recorded in a recording medium; a determining device which determines a number of pixels of the image data read by the image inputting device; a judging device which judges quality of an image that will be obtained when the image data read by the image inputting device is outputted to an outputting apparatus that performs at least one of printing and displaying of the at least one image, according to the number of the pixels determined by the determining device and a number of pixels required by the outputting apparatus; a displaying device which displays the information on the image data read by the image inputting device and displays a judging result obtained by the judging device; an instructing device which issues an instruction to an image outputting device to output the image data to the outputting apparatus; and the image outputting device which outputs the image data to the outputting apparatus according to the instruction issued by the instructing device.

According to the present invention, the user can easily select image files with resolutions suitable for the print size even if the user does not have a special knowledge of a quality, pixels and a resolution of photo image data.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a diagram showing a print image selecting picture for realizing resolutions of print images from colors;

FIG. 6 is a table showing qualities of prints according to numbers of pixels and print sizes;

FIG. 7 is a commercial picture displayed while main image data of image files are read;

DETAILED DESCRIPTION OF THE PREFERRED EMBODIMENT

This invention will be described in further detail by way of example with reference to the accompanying drawings.

Figure 1:
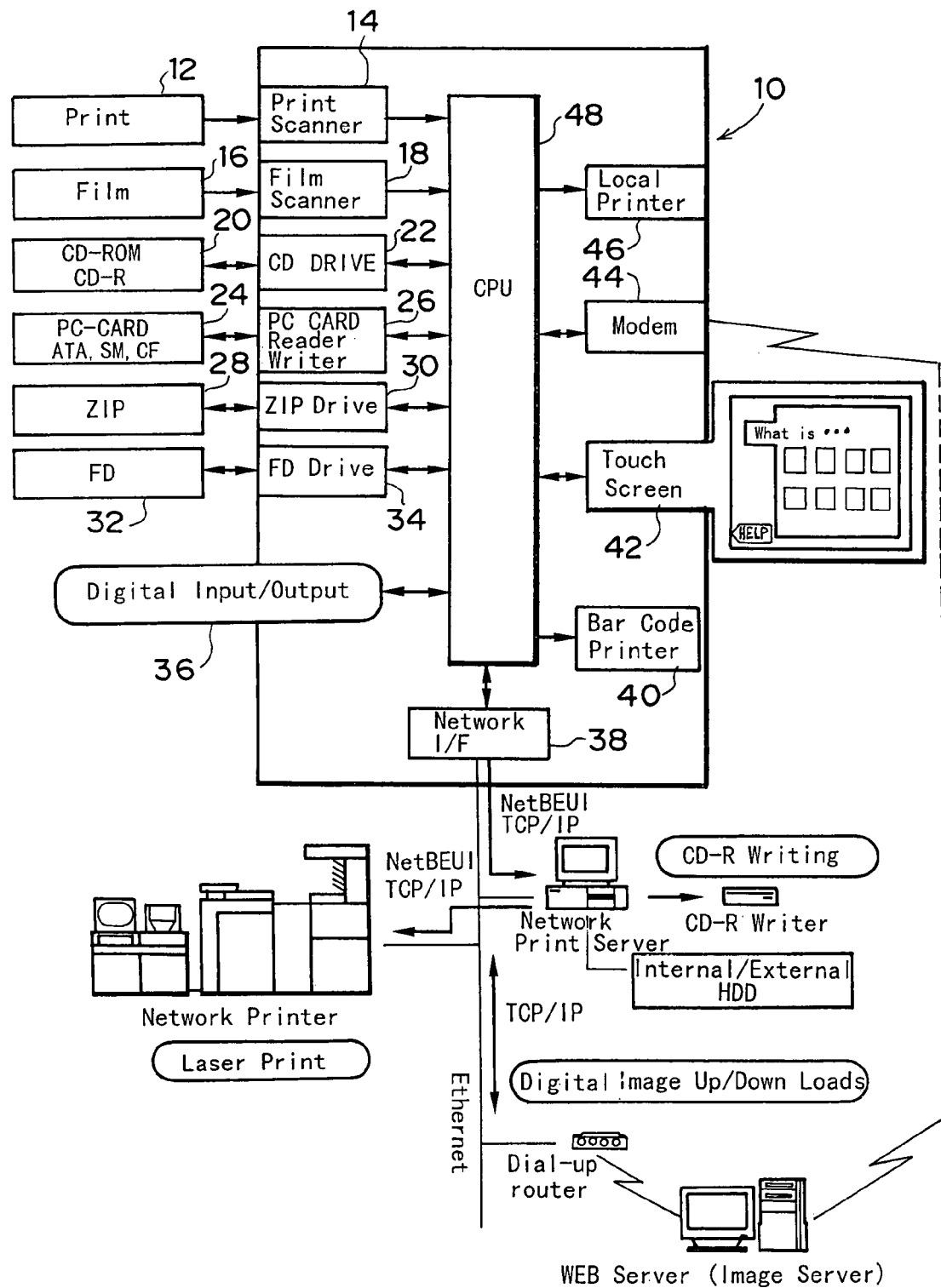
FIG. 1 is a block diagram showing an image inputting and outputting apparatus according to the present invention.

FIG. 1 is a block diagram showing an image inputting and outputting apparatus according to the present invention.

As shown in FIG. 1, the image inputting and outputting apparatus 10 comprises a print scanner 14 that is an inputting device for inputting an image (original image) of a print 12 as data, a film scanner 18 that is an inputting device for inputting an image of a film 16 as data, a CD drive 22 that can read image data recorded in a CD 20 such as a CD-ROM and a CD-R and output image data to the CD 20, a PC-CARD reader and writer 26 that can read image data recorded in a PC-CARD 24, which is a semiconductor recording medium, and output image data to the PC-CARD 24, a ZIP drive 30 that can read image data recorded in a ZIP 28, which is a magnetic recording medium, and output image data to the ZIP 28 and a floppy disk drive 34 that can read image data recorded in a floppy disk 32, which is a magnetic recording medium, and output data to the floppy disk 32.

The image inputting and outputting apparatus 10 also comprises an I/O port 36 that inputs and outputs digital signals, a network I/F 38 that is an interface for connecting the image inputting and outputting apparatus 10 to a network such as LAN and Ethernet and inputting and outputting image data and other data, a bar code printer 40 that outputs information on a file name and a print size of an image to be printed as a bar code, a touch screen 42 that is a displaying and inputting device that displays a picture for a user and inputs an image or an icon the user selects, a modem 44 that is an interface for inputting and outputting data such as image data from and to another apparatus through a telephone circuit, a local printer 46 that prints an image and an information processing device 48 that controls the image inputting and outputting apparatus 10 and determines the pixel number of image data and a size and the pixel number of an image when it is looked at and performs calculation and determination with regard to print quality and commands display of the determination results. The information processing device 48 is a so-called computer that includes a processor and a recording device. The recording device can store information on a resolution of image data, a resolution of an image and a resolution of an image when it is printed.

The operation procedure of the above-described image inputting and outputting apparatus 10 will now be explained.

The user sets a processing by selecting a desired item out of items displayed on the touch screen 42 that is a user interface as if the user talked with the image inputting and outputting apparatus 10.

Figure 2:
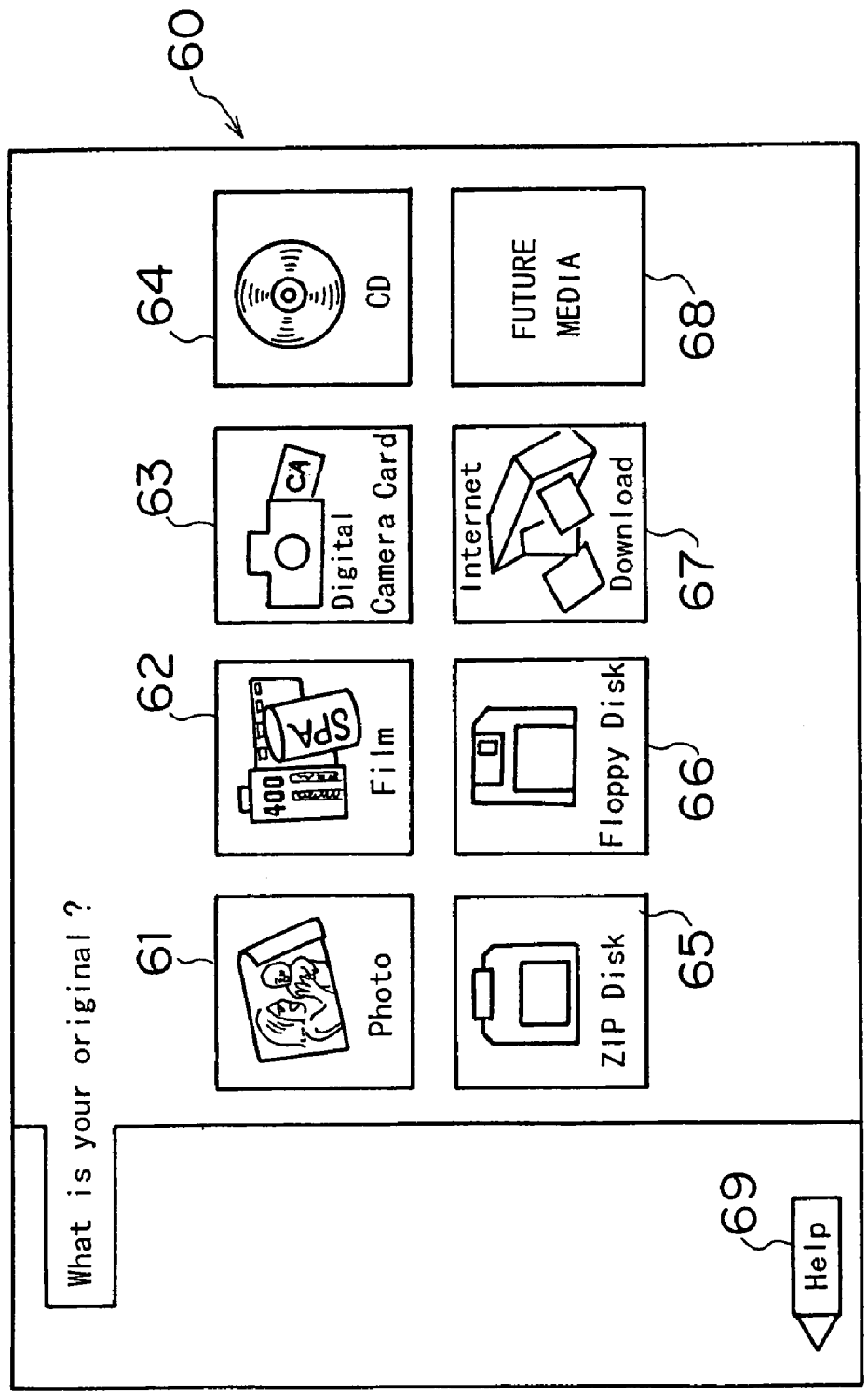
FIG. 2 is a drawing showing an image source selecting picture displayed on a touch screen of the image inputting and outputting apparatus.

FIG. 2 is a drawing showing an image source selecting picture 60 that is displayed on the touch screen 42 of the image inputting and outputting apparatus 10.

The image source selecting picture 60 in FIG. 2 is the initial picture, on which the user selects a source of image data to be inputted. Information on the source selected by the user is stored in the information processing device 48.

The following icons are displayed on the image source selecting picture 60; a print input icon 61 for selecting a method in which the print 12 is loaded in the print scanner 14 and the image is read from the print 12, a film input icon 62 for selecting a method in which the film 16 is loaded in the film scanner 18 and the image is read from the film 16, a PC-CARD input icon 63 for selecting a method in which image data captured by an electronic camera and recorded in the PC-CARD 24 is read, a CD input icon 64 for selecting a method in which image data recorded in the CD 20 is read, a ZIP input icon 65 for selecting a method in which image data recorded in a disk of the ZIP 28 is read, a floppy disk input icon 66 for selecting a method in which image data recorded in the floppy disk 32 is read, an Internet download input icon 67 for selecting a method in which image data is downloaded through the Internet and an undefined icon 68 that will be used if an inputting device is added in the future.

The user selects one of the image sources by touching the corresponding one of the icons other than the undefined icon 68. If the user selects the PC-CARD input icon 63, then a picture in FIG. 3 is displayed.

A help button 69 for showing how to operate the image inputting and outputting apparatus 10 is displayed on the image source selecting picture 60. If the user touches the help button 69, a picture showing how to use the image inputting and outputting apparatus 10 and the image source selecting picture 60 is displayed.

Figure 3:
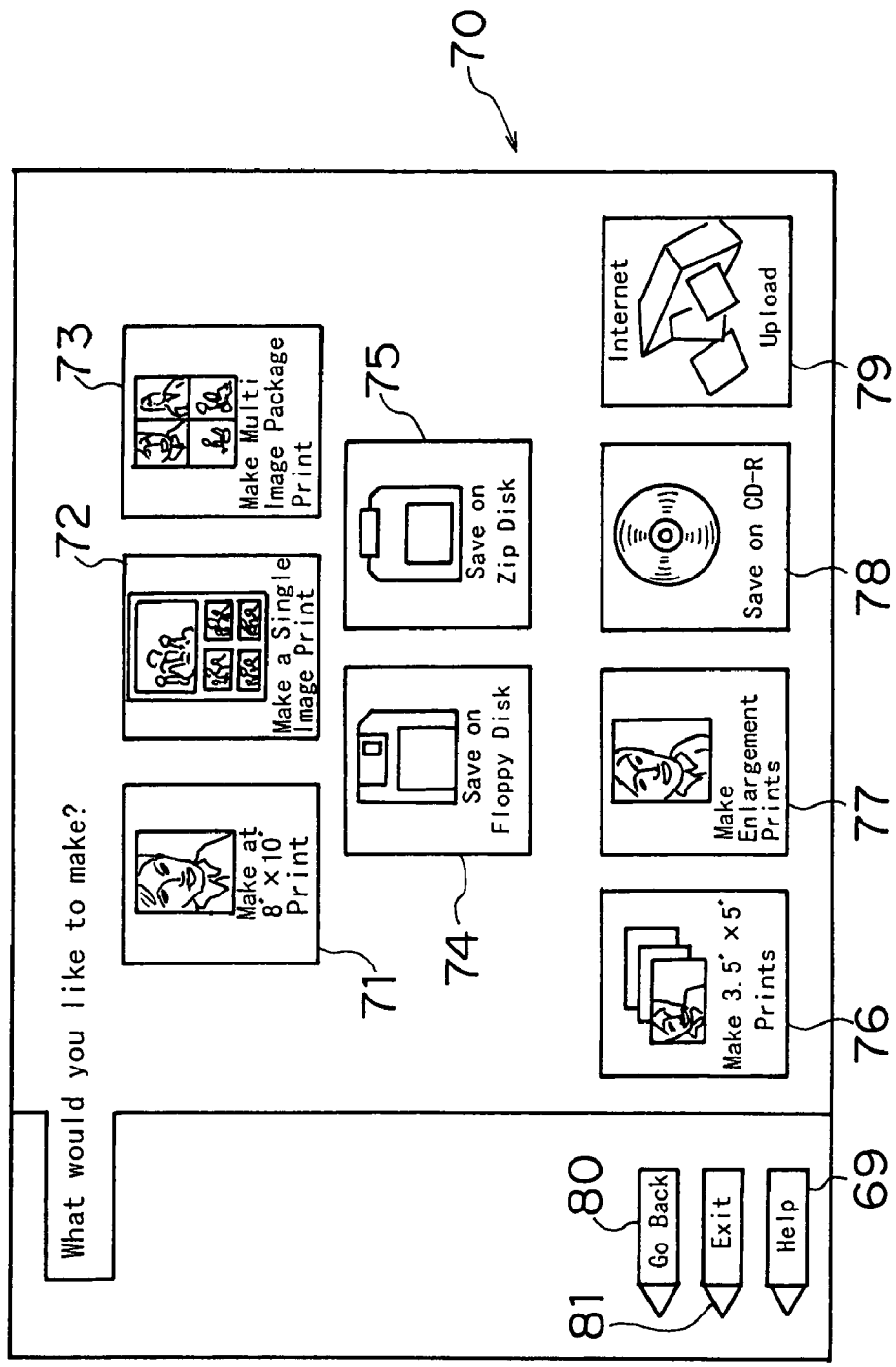
FIG. 3 is a drawing showing an image output method selecting picture displayed on the touch screen.

FIG. 3 is a drawing showing an image output method selecting picture 70 that is displayed on the touch screen 42 of the image inputting and outputting apparatus 10.

The image output method selecting picture 70 is a picture for selecting a device and a method for outputting the image data and a desired output size of the image. Information on the image output selected by the user is stored in the information processing device 48.

The following icons are displayed on the image output method selecting picture 70; an 8-by-10-inch print icon 71 for outputting image data of the selected image to make a print 8 by 10 inches, a package print icon 72 for making a plurality of prints of one selected image, a multi-image package print icon 73 for printing a plurality of selected images at one time, a floppy disk recording icon 74 for recording a selected image in the floppy disk 32, a ZIP recording icon 75 for recording the selected image in the ZIP 28, a 3.5-by-5-inch print icon 76 for outputting image data of the selected image to make a print 3.5 by 5 inches, an enlarged print icon 77 for making an enlarged print of an arbitrary size of the selected image, a CD-R recording icon 78 for recording the selected image in the CD-R and an Internet upload icon 79 for uploading image data through the Internet.

The user selects one of the output methods of the image data by touching the corresponding one of the icons. If the user selects the 3.5-by-5-inch print icon 76, then a picture in FIG. 4 is displayed.

A go-back button 80 for displaying the last selecting picture (the image source selecting picture 60) again and an exit button 81 for stopping the processing are displayed on the image output method selecting picture 70.

Figure 4:
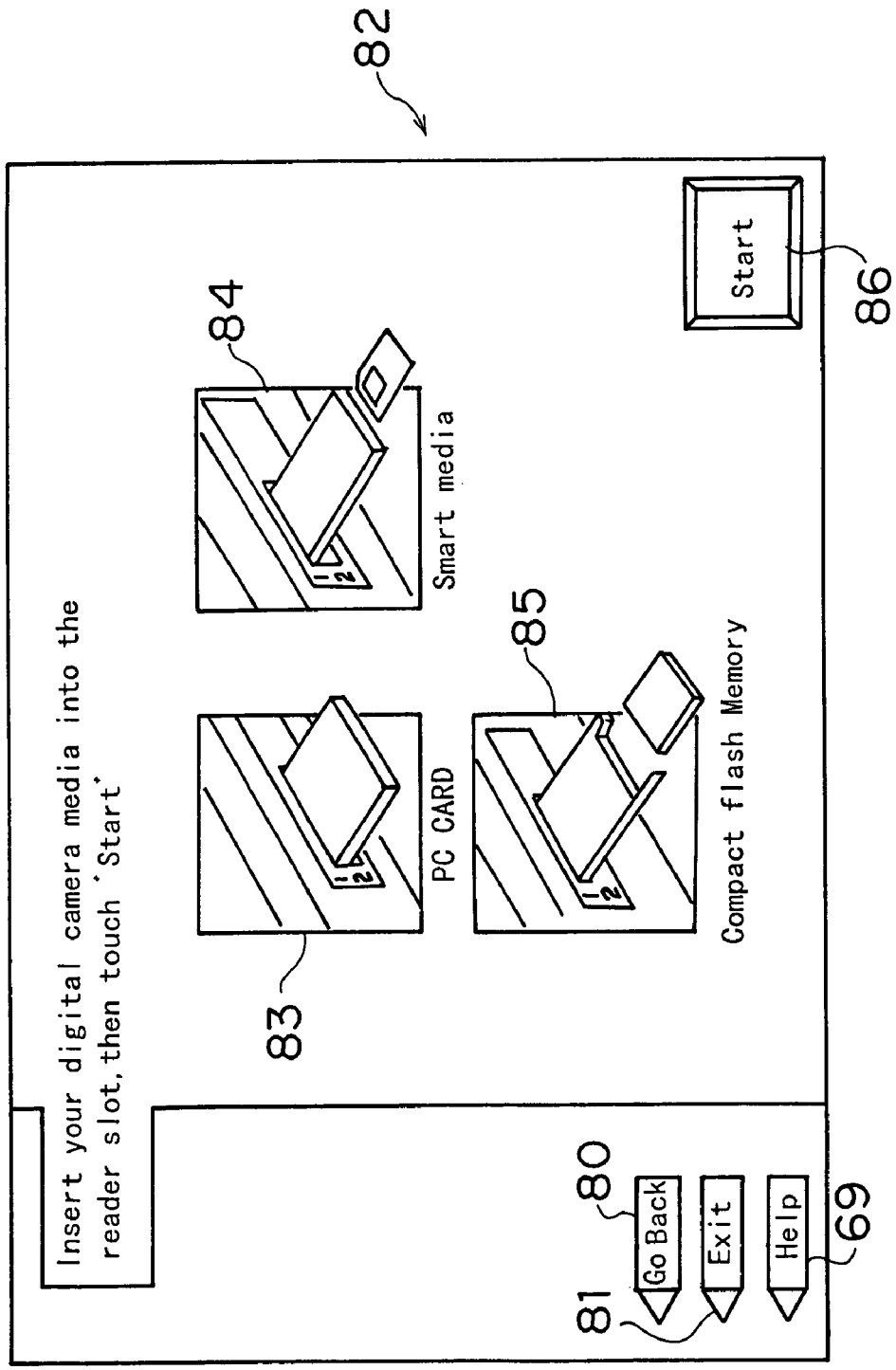
FIG. 4 is a drawing showing an image input procedure picture displayed on the touch screen of the image inputting and outputting apparatus.

FIG. 4 is a drawing showing an image input procedure picture displayed on the touch screen 42 of the image inputting and outputting apparatus 10.

The image input procedure picture 82 shows a procedure and information with regard to the PC-CARD 24. There are some different types of semiconductor recording media, and thus a method of using each medium is shown. For example, if a PCMCIA recording medium is used, the user inserts the PC-CARD 24 into the PC-CARD reader and writer 26 while referring to an illustration 83. If a smart media is used, the user refers to an illustration 84; and if a compact flash memory is used, the user refers to an illustration 85.

After the semiconductor recording medium is set and the image input becomes ready, the user touches a start button 86 for starting a reading processing for main image data to start reading and recording the image list of the image data recorded in the recording medium and information such as the size of the main images. Then, a picture in FIG. 5 is displayed.

FIG. 5 is a diagram showing a print image selecting picture 90 for realizing resolutions of print images from colors in the image inputting and outputting apparatus 10.

An image list for realizing the resolutions of the print images from colors is displayed on the print image selecting picture 90. The following are displayed on the print image selecting picture 90; an all button 93 for selecting all the images for printing, a none button 94 for selecting none of the images for printing, a selected image number displaying part 95 that displays the number of selected images, a view file list button 96 for displaying a list of image files read from the recording medium, a done button 97 for finishing selecting images for printing and starting to read the image data, the help button 69 for showing how to use the print image selecting picture 90, the go-back button 80 for displaying the last selecting picture (the image input procedure picture 82) again and the exit button 81 for stopping the processing.

If the user touches an image of the image list, then the image inputting and outputting apparatus 10 realizes that the user has selected the image file for printing and selection information on the selected image file is stored in the information processing device 48.

The following are displayed on the image list; an error image display 102 that indicates image data that can not be normally read with a black frame and words "Error Image", a too-small-image display 109 that indicates image data whose number of pixels is too small and is not suitable for printing with a black frame and words "Image too small" and a too-large-image display 107 that indicates image data whose number of pixels is too large and there are a possibility that the processing time might become too long and it could cause a malfunction of the device with a black frame and words "Image too large".

The following are also displayed on the image list; red-frame images 101, 105 and 111 with red frames indicating that the numbers of the pixels are not sufficient for the print size and the resolutions of the prints will be remarkably low, yellow-frame images 100, 104 and 108 with yellow frames indicating that the numbers of the pixels are slightly insufficient for the print size and the resolutions of the prints will be a little remarkably low and blue-frame images 103, 106 and 110 with blue frames indicating that the numbers of the pixels are sufficient for the print size and prints of good quality will be made.

As described above, the images have the frames of the colors according to the resolutions of the prints, and thus the user can easily realize the quality of the prints. Therefore, the user can select appropriate images without considering the relationship between the print size and the number of pixels of the main image data.

Information such as file names of the images may be displayed instead of the images, and the information may be of colors or the information may have frames of colors. The quality of the prints may be represented by marks or words of a color.

FIG. 6 is a table showing the qualities of the prints (colors of the frames) according to the numbers of the pixels and the print sizes.

As shown in FIG. 6, the error image display is displayed with the black frame when the image data can not be normally read, and the too-small-image display is displayed with the black frame when the number of pixels of the image data is too small and is not suitable for printing, and the too-large-image display is displayed with the black frame when the number of pixels of the image data is too large and there are a possibility that the processing time might be long and a possibility that might cause a malfunction of the device. The red frame is displayed when the number of the pixels is not sufficient for the print size and the resolution of the print will be remarkably low ("FAIR" in FIG. 6). The yellow frame is displayed when the number of the pixels is slightly insufficient for the print size and the resolution of the print will be a little remarkably low ("GOOD" in FIG. 6). The blue frame is displayed when the number of the pixels is sufficient for the print size and a print of good quality will be made ("EXCELLENT" in FIG. 6). The information processing device 48 performs the determination.

The quality of the print may be determined from a parameter of the resolution of the printer or the displaying screen. In this case, it is determined by the following inequalities, for example;

FD>3×PD too large (black frame and too-large-image display),

3×PD≧FD≧PD excellent (blue frame),

PD>FD≧PD/2 good (yellow frame),

PD/2>FD≧PD/10 fair (red frame), and

PD/10>FD too small (black frame and too-small-image display), wherein the PD represents a total resolution of the print (the resolution of the printer×print area) and the FD represents a total resolution of the image data.

When the image of the print 12 is read with the print scanner 14 or the image of the film 16 is read with the film scanner 18, the size of the image and the resolution of the print scanner 14 or the film scanner 18 are stored in the information processing device 48 as the information on the image data, and the quality of the print is determined from the information.

The blue-frame image 106 and the red-frame image 111 displayed on the print image selecting picture 90 in FIG. 5 are images of the same subject, and thus there seems to be no problem whichever image is selected. However, the number of the pixels of the main image data of the blue-frame image 106 is large (1800 pixels×1200 pixels) and thus a print 3.5 by 4 inches of good quality can be made, and the number of the pixels of the main image data of the red-frame image 111 is small (320 pixels×200 pixels) and thus the resolution of the print will be remarkably low. Even in this case, the user can easily realize the qualities of the prints only from the colors of the frames.

After the images for printing is selected on the print image selecting picture 90, a commercial picture 120 in FIG. 7 is displayed and the image inputting and outputting apparatus 10 reads the main image data of the selected image files. The time until the reading is finished is indicated for the user by a bar graph 122 or the like since the image data is generally large. After all the selected image files are read, a selected image displaying picture 130 in FIG. 8 is displayed.

Figure 8:
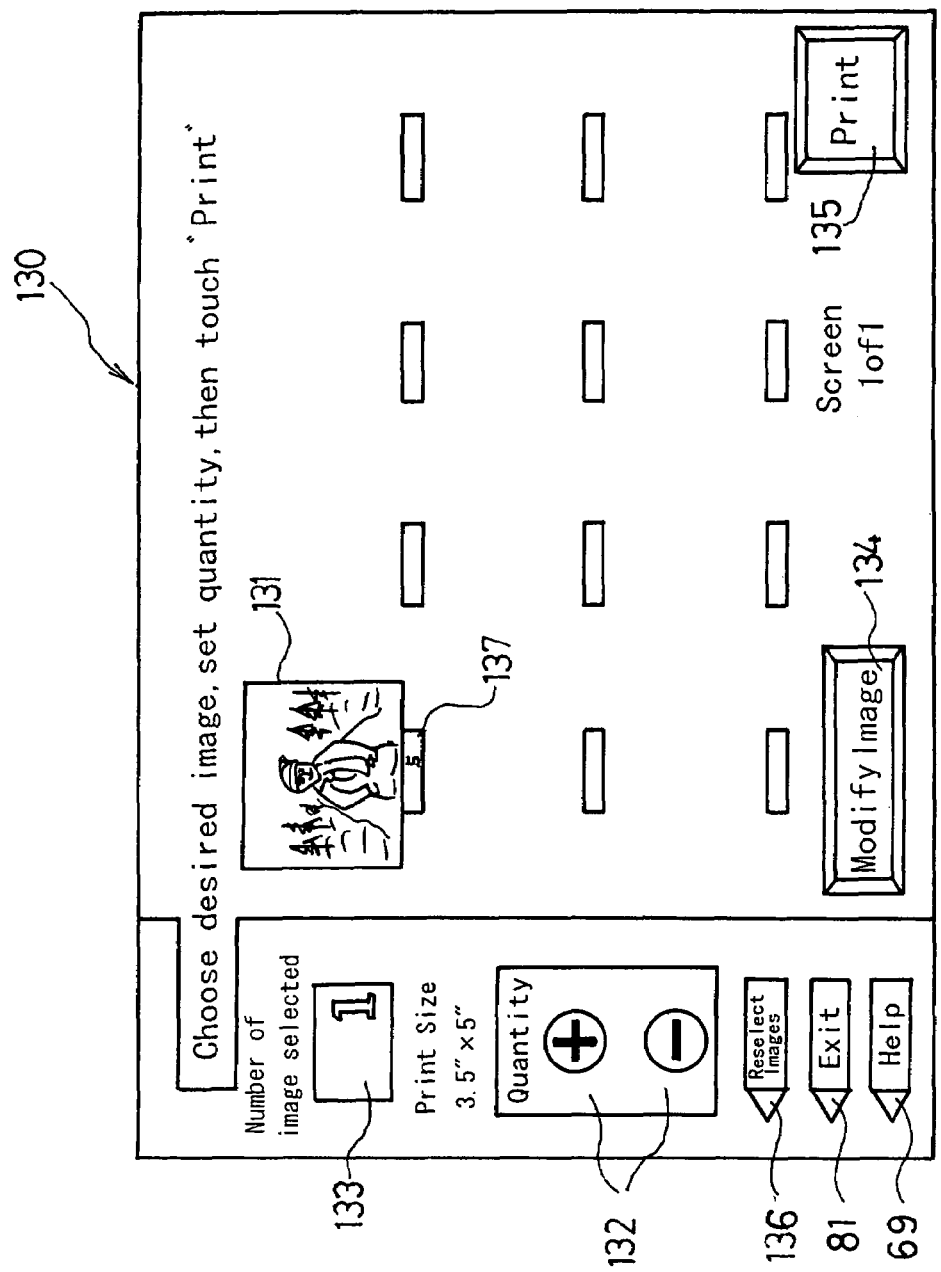
FIG. 8 is a drawing showing a selected image displaying picture on which only images selected on the print image selecting picture are displayed.

FIG. 8 is a drawing showing the selected image displaying picture 130 on which only the images selected on the print image selecting picture 90 is displayed.

The following are displayed on the selected image displaying picture 130; a selected image 131, print number inputting buttons 132 for inputting the number of the prints, a selected image number displaying part 133 that displays the number of the selected image, an image modifying button 134 for displaying an image modifying picture for modification of the image to be printed such as red-eye-effect cancellation, trimming, monotone conversion, transfer on the image, rotation on the image, combination with a template image, a printing start button 135 for starting to print the image or outputting printing condition setting results, an image reselecting button 136 for displaying the print image selecting picture 90 again, a print number displaying part 137 that shows the inputted number of the prints, the help button 69 for showing how to use the selected image displaying picture 130 and the exit button 81 for stopping the processing.

On the selected image displaying picture 130, the user inputs the number of the prints with the print number inputting buttons 132 and then pushes the printing start button 135 for starting the printing. Then, a commercial picture 140 in FIG. 9 is displayed.

Figure 9:
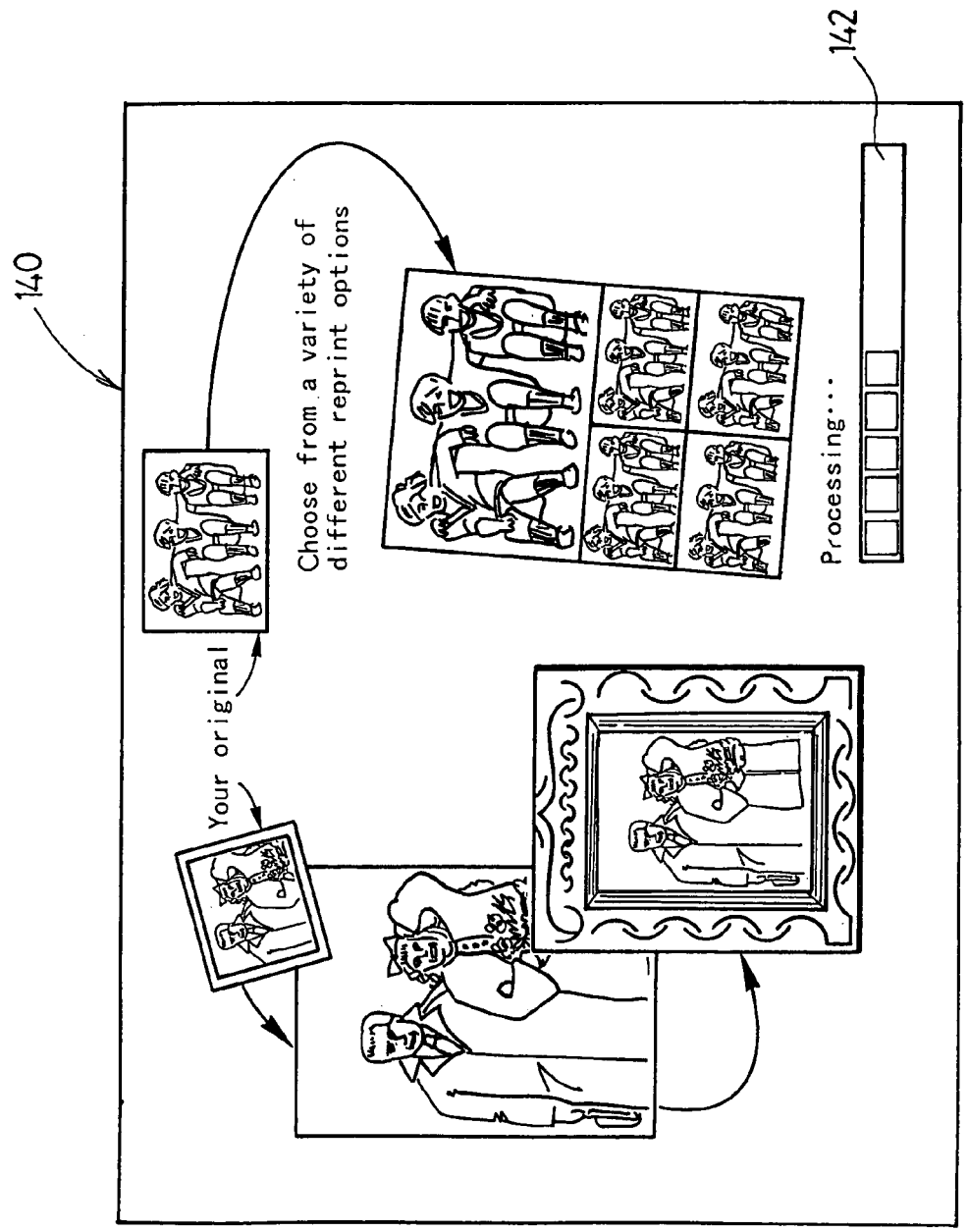
FIG. 9 is a commercial picture displayed while images to be printed are transmitted.

FIG. 9 shows the commercial picture 140 displayed while the images to be printed are transmitted. The time until the transmission is finished is indicated for the user by a bar graph 142 or the like since the main image data is generally large. After all the selected image files are transmitted, the local printer 46 outputs the inputted numbers of the selected images.

The print data may be transmitted to a network print server such as a printing laboratory away from the image inputting and outputting apparatus 10 through the modem 44 or the network I/F 38 in FIG. 1 and a network printer may prints the selected images instead of the local printer 46. In this case, the bar code printer 40 of the image inputting and outputting apparatus 10 outputs a card on which the information on the images to be printed is recorded as a bar code for the user. By bringing the outputted card to a designated counter, the user can get the prints outputted from the network printer in return for the charge.

The main image data with the resolution suitable for the display designated by the user may be transmitted to a server through the Internet, and the main image may be displayed on the screen.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image inputting and outputting apparatus, comprising:
   an image inputting device which reads image data of at least one image recorded in a recording medium;
   a determining device which determines a number of pixels of the image data read by the image inputting device;
   a judging device which judges quality of an image that will be obtained when the image data read by the image inputting device is outputted to an outputting apparatus that performs at least one of printing and displaying of the at least one image, according to the number of the pixels determined by the determining device and a number of pixels required by the outputting apparatus;
   a displaying device which displays the at least one image according to the image data read by the image inputting device and displays a judging result obtained by the judging device;
   an instructing device which issues an instruction to an image outputting device to output the image data to the outputting apparatus; and
   the image outputting device which outputs the image data to the outputting apparatus according to the instruction issued by the instructing device.

2. The image inputting and outputting apparatus as defined in claim 1, further comprising:
   an image output size selecting device which selects an image output size out of image output sizes for the at least one of the printing and the displaying,
   wherein the judging device changes the number of the pixels required by the outputting apparatus according to the image output size selected by the image output size selecting device to judge the quality of the image.

3. The image inputting and outputting apparatus as defined in claim 1, wherein the displaying device displays a plurality of images as a list and displays the judging result obtained by the judging device for each of the plurality of the images.

4. The image inputting and outputting apparatus as defined in claim 3, wherein the instructing device comprises an image selecting device which selects at least one image to be outputted to the outputting apparatus from the plurality of images displayed on the displaying device.

5. The image inputting and outputting apparatus as defined in claim 1, wherein the image data includes at least main image data of the main image data and list image data.

6. The image inputting and outputting apparatus as defined in claim 5, wherein:
   the image inputting device inputs a main image and a list image of the main image;
   the displaying device displays the inputted list image;
   the determining device determines the number of pixels of the main image; and
   the judging device judges the quality of the image that will be obtained when the image data read by the image inputting device is outputted to the outputting apparatus that performs the at least one of the printing and the displaying of the image, according to the number of the pixels of the main image determined by the determining device and the number of the pixels required by the outputting apparatus.

7. The image inputting and outputting apparatus as defined in claim 1, wherein the displaying device displays information on the quality of the image by at least one of colors, words and marks according to the judging result.

8. The image inputting and outputting apparatus as defined in claim 1, wherein the displaying device indicates the quality of the image by at least two colors of red, yellow and blue according to the judging result.

9. The image inputting and outputting apparatus as defined in claim 1, wherein the displaying device displays, around the judging result, a frame in a color according to the quality of the image.

10. The image inputting and outputting apparatus as defined in claim 1, wherein the displaying device displays, according to the judging result, at least one of that the number of the pixels of the image data is too large, that the number of the pixels of the image data is too small, and that it is impossible to input the image data.

11. The image inputting and outputting apparatus as defined in claim 1, wherein the outputting apparatus is one of a printer, a display, and a device on a network.

12. The image inputting and outputting apparatus as defined in claim 1, wherein the apparatus determines a resolution suitable for a print size of the at least one image.

13. The image inputting and outputting apparatus as defined in claim 1, further comprising an image source selecting device with which a user selects a source of an image to be printed.

14. The image inputting and outputting apparatus as defined in claim 1, further comprising an output method selecting device with which a user selects an output method for outputting the at least one image.

15. The image inputting and outputting apparatus as defined in claim 13, further comprising an output method selecting device with which the user selects an output method for outputting the at least one image.

16. The image inputting and outputting apparatus as defined in claim 13, further comprising an indicating unit for indicating whether a resolution of the image selected by the user is suitable for the output method selected by the user.

17. An image inputting and outputting apparatus, comprising:
   an image inputting device which reads image data of at least one image and information on the image data recorded in a recording medium;
   a determining device which determines a number of pixels of the image data read by the image inputting device;
   a judging device which judges quality of an image that will be obtained when the image data read by the image inputting device is outputted to an outputting apparatus that performs at least one of printing and displaying of the at least one image, according to the number of the pixels determined by the determining device and a number of pixels required by the outputting apparatus;
   a displaying device which displays the information on the image data read by the image inputting device and displays a judging result obtained by the judging device;
   an instructing device which issues an instruction to an image outputting device to output the image data to the outputting apparatus; and
   the image outputting device which outputs the image data to the outputting apparatus according to the instruction issued by the instructing device.

18. The image inputting and outputting apparatus as defined in claim 17, further comprising:
   an image output size selecting device which selects an image output size out of image output sizes for the at least one of the printing and the displaying,
   wherein the judging device changes the number of the pixels required by the outputting apparatus according to the image output size selected by the image output size selecting device to judge the quality of the image.

19. The image inputting and outputting apparatus as defined in claim 17, wherein the displaying device displays information on a plurality of images as a list and displays the judging result obtained by the judging device for each of the plurality of the images.

20. The image inputting and outputting apparatus as defined in claim 19, wherein the instructing device comprises an image selecting device which selects at least one image to be outputted to the outputting apparatus from the plurality of images.

21. The image inputting and outputting apparatus as defined in claim 17, wherein the displaying device displays information on the quality of the image by at least one of colors, words and marks according to the judging result.

22. The image inputting and outputting apparatus as defined in claim 17, wherein the displaying device indicates the quality of the image by at least two colors of red, yellow and blue according to the judging result.

23. The image inputting and outputting apparatus as defined in claim 17, wherein the displaying device displays, around the judging result, a frame in a color according to the quality of the image.

24. The image inputting and outputting apparatus as defined in claim 17, wherein the displaying device displays, according to the judging result, at least one of that the number of the pixels of the image data is too large, that the number of the pixels of the image data is too small, and that it is impossible to input the image data.

25. The image inputting and outputting apparatus as defined in claim 17, wherein the outputting apparatus is one of a printer, a display, and a device on a network.

26. An image inputting and outputting apparatus, comprising:
   an image inputting device which reads image data of at least one image recorded in a recording medium;
   a selecting device with which a user selects at least one of said at least one image to be outputted and an output device through which said at least one image is outputted;
   a determining device which determines a number of pixels of the image data read by the image inputting device; and
   a judging device which judges whether the number of pixels of the image data is suitable for said output device.

* * * * *